(12) United States Patent
Riondel et al.

(10) Patent No.: US 11,499,047 B2
(45) Date of Patent: Nov. 15, 2022

(54) AQUEOUS ALKYD DISPERSIONS WITH IMPROVED APPLICATION PERFORMANCES IN TERMS OF RESISTANCE TO BLOCKING AND YELLOWING, HARDNESS DEVELOPMENT AND SHINE

(71) Applicant: Arkema France, Colombes (FR)

(72) Inventors: Alain Riondel, Saint Pathus (FR); Emile Harlay, Saint Martin Longueau (FR); Michael Kurczak, Liancourt (FR); Jerome Mazajczyk, La Croix Saint Ouen (FR); Patricia Beurdeley, Montmorency (FR); Cecile Chaineau, Plessier sur Saint Just (FR)

(73) Assignee: Arkema France, Colombes (FR)

( * ) Notice: Subject to any disclaimer, the term of this patent is extended or adjusted under 35 U.S.C. 154(b) by 781 days.

(21) Appl. No.: 16/322,533

(22) PCT Filed: Jul. 21, 2017

(86) PCT No.: PCT/FR2017/052009
§ 371 (c)(1),
(2) Date: Feb. 1, 2019

(87) PCT Pub. No.: WO2018/029407
PCT Pub. Date: Feb. 15, 2018

(65) Prior Publication Data
US 2021/0371647 A1 Dec. 2, 2021

(30) Foreign Application Priority Data
Aug. 11, 2016 (FR) ........................ 1657707

(51) Int. Cl.
| | |
|---|---|
| *C08L 67/08* | (2006.01) |
| *C08K 5/521* | (2006.01) |
| *C08J 3/05* | (2006.01) |
| *C08G 63/91* | (2006.01) |
| *C09D 5/02* | (2006.01) |
| *C09D 167/08* | (2006.01) |

(52) U.S. Cl.
CPC .......... *C08L 67/08* (2013.01); *C08G 63/918* (2013.01); *C08J 3/05* (2013.01); *C08K 5/521* (2013.01); *C09D 5/024* (2013.01); *C09D 167/08* (2013.01); *C08L 2201/54* (2013.01)

(58) Field of Classification Search
None
See application file for complete search history.

(56) References Cited

U.S. PATENT DOCUMENTS

| | | | |
|---|---|---|---|
| 6,277,953 B1* | 8/2001 | Nothnagel | C08J 7/046 528/489 |
| 6,780,910 B2* | 8/2004 | Bouvy | C08J 3/03 524/376 |
| 7,718,731 B2* | 5/2010 | Cogordan | C09D 167/08 524/878 |
| 2006/0100316 A1 | 5/2006 | Cogordan | |
| 2011/0126602 A1* | 6/2011 | Wan | C05G 5/37 71/27 |
| 2016/0289494 A1* | 10/2016 | Bergman | C09D 167/08 |

FOREIGN PATENT DOCUMENTS

WO    WO 2009/095569 A1    8/2009

OTHER PUBLICATIONS 9 page brochure for Synaqua 4804 by Arkema Inc., 2013.*

* cited by examiner

*Primary Examiner* — Tae H Yoon
(74) *Attorney, Agent, or Firm* — Lynn B. Morreale

(57) ABSTRACT

The present invention relates to aqueous alkyd resin dispersions comprising a) a short oil alkyd resin comprising, in its fatty acid component a1), at least one polyunsaturated fatty monoacid a11) having at least two unsaturations per molecule and comprising at least 35% by weight of a monoacid a111) having conjugated unsaturations, the content by weight of said fatty monoacid a111), with respect to said alkyd resin, being at least 5%, preferably from 5% to 40% and more preferably from 5% to 35%, and b) at least one anionic phosphate surfactant. The invention also covers a preparation process and its use in decorative coatings. The coatings based on these aqueous dispersions exhibit improved performance qualities in resistance to blocking and yellowing, in development of hardness and in gloss.

17 Claims, No Drawings

AQUEOUS ALKYD DISPERSIONS WITH IMPROVED APPLICATION PERFORMANCES IN TERMS OF RESISTANCE TO BLOCKING AND YELLOWING, HARDNESS DEVELOPMENT AND SHINE

CROSS-REFERENCE TO RELATED APPLICATIONS

This application is a national stage application under 35 U.S.C. § 371 of PCT/FR2017/052009, filed Jul. 21, 2017 which claims benefit to application FR 16 57707, filed Aug. 11, 2016.

The present invention relates to alkyd emulsions, also referred to here as alkyd dispersions, which have improved applicative performance qualities for the coatings obtained, in comparison with those of the commercial alkyd emulsions used as reference.

More particularly, the invention is targeted at improving the performance qualities of resistance to blocking, of resistance to yellowing, of development of hardness and with regard to the gloss of said emulsion according to the invention, in comparison with the reference emulsions, while providing it with a stability on storage for 1 month at 50° C.

The present invention relates first to an aqueous dispersion of alkyd resin based on fatty acids having conjugated unsaturation and a particular surfactant having specific applicative performance qualities regarding the resistance to blocking and to yellowing, the development of hardness and the gloss and subsequently to a specific process for obtaining this dispersion and to its use, in particular as binder in aqueous coating compositions and more particularly aqueous decorative coating compositions.

The technical problem which the present invention seeks to solve, in comparison with the state of the art, is that of finding a difficult compromise in performance qualities, in comparison with the state of the art, which thus consists, as set out above, in an improvement in the resistance to yellowing, in the resistance to blocking, in the development of hardness during the drying and in the gloss of the coating obtained from the aqueous dispersion of the alkyd resin having a specific conjugated unsaturation and prepared in the presence of a specific surfactant, this being achieved without harm to its stability on storage, in particular while providing a stability on storage at 50° C. of one month.

By the specific choice of the content of specific conjugated unsaturation of the resin and by the use of a specific phosphate surfactant, in particular a phosphate ester, more particularly comprising a phosphate monoester and diester of a specific alcohol, the present invention overcomes the disadvantages of the state of the art (need for abovementioned improvements) and makes it possible to obtain aqueous dispersions of alkyd resins with the improved performance qualities mentioned.

The subject matter of the present invention thus relates first to an aqueous dispersion of at least one alkyd resin obtained in the presence of a particular phosphate surfactant.

A second subject matter of the invention relates to a specific process for the preparation of said aqueous dispersion of alkyd resin of the invention.

An aqueous coating composition comprising at least one aqueous dispersion of alkyd resin according to the invention also comes within the invention.

Another subject matter of the invention is the use of the aqueous dispersion of the invention as binder for aqueous coating compositions, preferably for aqueous decorative coating compositions and in particular aqueous paint, varnish or stain compositions.

Finally, a last subject matter of the invention relates to a coating which results from at least one aqueous dispersion of alkyd resin according to the invention or obtained by the process according to the invention.

The first subject matter of the present invention thus relates to an aqueous dispersion of alkyd resin, which comprises:

a) a short oil alkyd resin having a Noury viscosity at 110° C. according to the AFNOR XPT51213 method ranging from 7000 to 13 000 mPa·s and preferably from 9000 to 12 000 mPa·s and comprising, in its fatty acid component a1), at least one polyunsaturated fatty monoacid a11) having at least two unsaturations per molecule and a content by weight of monoacid a111) having conjugated unsaturations (conjugated monoacid) of at least 35%, preferably of at least 42%, the content by weight of said fatty monoacid a111), with respect to said alkyd resin, being at least 5%, preferably from 5% to 40%, more preferably from 5% to 35%, b) at least one anionic phosphate surfactant, in particular a phosphate alkyl alkoxy ester, said surfactant b) more particularly being a mixture of phosphate monoester and diester, the alkyl group being a $C_{10}$-$C_{16}$ alkyl group and being alkoxylated with 4 to 10 alkoxy units, said alkoxy units preferably being chosen from ethoxy and/or propoxy units, more preferably being ethoxy units.

A "short oil alkyd" resin means in this instance, according to the invention, an alkyd resin having a content by weight of unsaturated fatty acid (as triglyceride equivalent) of less than 45%.

Preferably, the alkyd resin a) has a number-average molecular weight Mn ranging from 2500 to 6000 and more preferably from 3500 to 5000, measured by GPC in THF, in polystyrene equivalents.

According to a preferred form of the dispersion, according to the invention, said fatty monoacid a11) is a product of the dehydration of castor oil.

Mention may be made, as suitable examples of polyunsaturated fatty monoacids a11) comprising conjugated monoacids according to a111), of Nouracid® DE656, DE655, DE554, DE503, DZ453 (dehydrated castor fatty acid—Oleon), Nouracid® HE456, HE305, HE304 (isomerized sunflower fatty acid—Oleon), Nouracid® LE805 (isomerized linseed fatty acid—Oleon), Dedico® 5981 (dehydrated castor fatty acid—Croda), Isomergin® SK, SY, SF (isomerized vegetable fatty acid—Hobum Harburger Fettchemie Brinckman & Mergell GmbH), Pamolyn® 300, 380 (isomerized linoleic acid—Eastman) and, as preferred, dehydrated castor oil fatty acid.

According to another particular form of the dispersion of the invention, the acid number of said alkyd resin is less than 25, preferably less than 15 and more preferably less than 12 mg KOH/g.

More particularly, said surfactant b) is a phosphate ester of a $C_{10}$ to $C_{16}$ alcohol which is alkoxylated with from 4 to 10 ethoxy units, preferably from 4 to 8 ethoxy units.

According to a particular form, said surfactant b) comprises a phosphate diester and, preferably, a phosphate diester and a phosphate monoester of said alcohol (mixture of phosphate monoester and of phosphate diester).

According to another particular and preferred form, said surfactant b) is a mixture of phosphate monoester and of phosphate diester and the ratio by weight of the phosphate monoester to the phosphate diester is from 0.8 to 12. More particularly in this case, said alcohol is a $C_{12}$ to $C_{14}$ alcohol, preferably a $C_{13}$ alcohol. More preferably, the number of said alkoxy units is from 4 to 8 and preferably 6 and more preferably said units are ethoxy units.

The $C_{10}$ to $C_{16}$ alcohol is preferably aliphatic and can be linear or branched.

The content by weight of said surfactant b), with respect to said dispersion, can vary from 1% to 3%, preferably from 1.5% to 2.5% and more preferably from 1.8% to 2.2%, by weight, with respect to the dispersion.

The content by weight of said alkyd resin a), with respect to said dispersion, can vary from 35% to 65%, preferably from 40% to 60% and more preferably from 45% to 55%.

According to another more particular preferred form, said dispersion of the invention can comprise, in addition to said surfactant b), a surfactant c) chosen from non-ionic surfactants and preferably selected from polymeric non-ionic surfactants (which are oligomers) with, in this case, a ratio by weight of anionic surfactant b) to non-ionic surfactant c), b)/c), ranging from 1 to 3 and preferably from 1.5 to 2.5.

Mention may be made, as preferred examples of non-ionic surfactants suitable as surfactants c), of: ethoxylated (2 to 35 EO) $C_{12}$-$C_{18}$ fatty alcohols, propoxylated/ethoxylated $C_4$-$C_8$ alcohols with a propoxy/ethoxy ratio by weight of the order of 1, ethoxylated (2-40 EO) iso-$C_{10}$ fatty alcohol, ethoxylated (2-40 EO) monobranched $C_{10}$-$C_{18}$ fatty alcohols, $C_{18}$ sorbitol esters, ethoxylated (5-20 EO units) sorbitol esters or ethoxylated (7-100 EO) $C_{12}$-$C_{18}$ fatty acids, ethoxylated (30-40 EO) castor oil, ethoxylated (7-60 EO) hydrogenated castor oil, fatty esters, such as: glyceryl palmitate, glyceryl stearate, ethylene glycol stearate, diethylene glycol stearate, propylene glycol stearate, polyethylene glycol 200 stearate (PEG of Mn=200) or ethoxylated (2-15 EO) $C_{18}$ fatty esters.

The content of the surfactants of type c) can vary from 0.1% to 1% by weight, with respect to the dispersion.

According to another possible form of said alkyd resin dispersion, said resin comprises, in its acid component A), at least one aromatic dicarboxylic acid or anhydride a2) and optionally an aromatic monocarboxylic acid a3) and, in its alcohol component B), a polyol b1) with a functionality ranging from 3 to 6 and preferably of 4. More preferably, said polyols are aliphatic.

Mention may be made, as suitable examples of aromatic polycarboxylic acids or anhydrides a2) with a functionality of 2 to 4 with intermediate mean functionalities which can be obtained by mixing at least two polyacids, of the following acids or anhydrides for the products of functionality 2: terephthalic, isophthalic or phthalic, for the products of functionality 3: trimellitic acid and anhydride, and, for those of functionality 4: pyromellitic anhydride.

Mention may be made, as suitable examples of aromatic monocarboxylic acids a3), of benzoic acid and p-(tert-butyl) benzoic acid.

Mention may be made, as suitable examples of polyols b1) with a functionality ranging from 3 to 6, of the following polyols (by functionality):
  trifunctional (triols): trimethylolpropane, glycerol or trimethylolethane and preferably trimethylolpropane,
  tetrafunctional (tetrols): ditrimethylolpropane ether or pentaerythritol and preferably pentaerythritol,
  pentafunctional and hexafunctional: dipentaerythritol (6), polyglycerol (5-6) and sorbitol (6).

According to another option of said dispersion according to the invention, said alkyd resin additionally comprises, in its fatty acid component a1), at least one other polyunsaturated fatty monoacid a12) having at least two unsaturations per molecule and comprising at least 90% by weight of a non-conjugated polyunsaturated monoacid a121), preferably resulting from soybean oil, sunflower oil or tall oil (TOFA: tall oil fatty acids). According to a particular option, said alkyd comprises, in its fatty acid component a1), only the monoacid a111) as defined above.

The second subject matter of the invention relates to a process for the preparation of the aqueous dispersion according to the invention, as described above, which comprises the following successive stages:
i) Preparation of said alkyd resin a) in bulk,
ii) Melting said resin a),
iii) Addition of said surfactant b) and optionally of said non-ionic surfactant c), as defined above,
iv) Partial addition of water,
  before
v) Neutralization by a base of the acidity of a) and of b), said base preferably being selected from: LiOH, KOH, NaOH, NH$_4$OH and tertiary amines,
vi) Emulsification by phase inversion with adjustment of the solids content after the emulsification.

Mention may be made, as examples of tertiary amines, of triethylamine.

More particularly, in said process, stages ii) and iii) are carried out at a temperature ranging from 80 to 100° C., stage iv) at a temperature ranging from 80 to 65° C., stage v) at a temperature ranging from 60 to 70° C. and stage vi) at a temperature ranging from 55 to 65° C.

The aqueous dispersion of the invention preferably has a mean particle size ranging from 50 to 500 nm and preferably from 100 to 300 nm (by laser particle sizing) and a solids content ranging from 35% to 65%, preferably from 40% to 60% and more preferably from 45% to 55%.

The solids content is measured by the ISO 3251 method.

The alkyd resin according to the invention can have an OH number ranging from 20 to 150 mg KOH/g, preferably from 30 to 100 mg KOH/g, and a mean functionality f ranging from 1.9 to 2.1. This mean functionality is defined according to the following relationship:

$$f = 2\Sigma n_i fi / \Sigma n_i$$

with $n_i$ and fi respectively being the number of moles and functionality of the acid or alcohol component i (mean over the whole of the reactive acid and alcohol components).

Another subject matter according to the invention relates to a coating composition which comprises at least one aqueous dispersion as defined above according to the invention, including dispersion as obtained by the process defined above.

More particularly, said composition is an aqueous decorative coating composition, in particular an aqueous paint, varnish or stain composition, more particularly an aqueous paint composition.

More particularly still, said coating composition is an aqueous decorative coating composition and more preferably for paints, varnishes or stains, more preferably still for finishing paints, varnishes or stains and more particularly interior or exterior finishing paints, varnishes or stains for wood, metal, wall or plastic.

Another subject matter of the invention relates to the use of the aqueous dispersion of the invention as defined above, including dispersion obtained by the process as defined above, as aqueous binder for aqueous coating compositions, preferably for aqueous decorative coating compositions and more preferably for paints, varnishes or stains, more preferably still for finishing paints, varnishes or stains and more particularly interior or exterior finishing paints, varnishes or stains for wood, metal, wall or plastic.

More particularly still, said use relates to paints having, for a PVC (Pigment Volume Concentration) of 18% and an iron-based drying agent, a resistance to blocking of less than 2 according to the method described in point 8 of "Tests and methods used" of the description, a development of Persoz hardness after 14 days of at least 100 s according to the ISO 1522 method and a resistance to yellowing according to ASTM 31396 of less than 2 after 1 month of exposure at ambient temperature and a 20° gloss after 24 h (of drying) of greater than 93% according to the ISO 2813 method.

Finally, the present invention covers a coating, preferably a paint, varnish or stain coating, which results from the use of at least one aqueous dispersion of the invention as defined above or as obtained by a process as defined according to the invention above.

The examples which follow illustrate the invention and its performance qualities and do not in any way limit its scope.

EXPERIMENTAL PART

1) Starting Materials (See Table 1 Below)

TABLE 1

| Name | Chemical name | Technical function | Characteristics |
|---|---|---|---|
| SOFA Nouracid ® SZ 35 | Soybean fatty acid (90% non-conjugated polyunsaturated a121)) | a12 | Functionality 1 |
| Nouracid ® DE 656 | Dehydrated castor fatty acid (62% of polyunsaturated a111)) | a11 | Functionality 1 |
| Benzoic acid | Benzoic acid | a3 | Functionality 1 |
| Pentaerythritol | Pentaerythritol | b1 | Functionality 4 |
| Phthalic anhydride | Phthalic anhydride | a2 | Functionality 2 |
| 10% LiOH | Lithium hydroxide as a 10% by weight solution | Neutralizing agent (base) | |
| Alkoxylated alkyl phosphate ($C_{13}$ alkyl, 6 EO), mono/diester = 0.8-1.2, surfactant | | Ionic surfactant b) | |
| Ethoxylated/ propoxylated $C_4$-$C_8$ alcohol EO/PO ratio of 1 | | Non-ionic surfactant c) | |

2) Examples 2.1) Synthesis of the alkyd A for the dispersion B according to the invention Example 1

285 g of soybean fatty acid (SOFA) and 95 g of Nouracid® DE656, 265.9 g of pentaerythritol, 287.1 g of phthalic anhydride and 166.3 g of benzoic acid are charged to a 1.5 liter reactor comprising:
 a dip pipe for the addition of nitrogen,
 a temperature probe,
 a reflux condenser supplied with water at 12° C.,
 a round-bottomed flask for recovering the water resulting from the esterification reaction.

While bubbling nitrogen through it, the combined mixture is brought to 240° C. using an electric heating mantle and the water formed is distilled as it is formed until an acid number of less than 12 is obtained. At the end of the synthesis, a viscous alkyd resin A is obtained which exhibits the following characteristics:

Acid number: 11.5 mg KOH/g

Solids content: 100%

Noury viscosity at 110° C. according to the AFNOR XPT 51213 method: 110 000 mPa·s 2.2) Dispersion of the alkyd A in order to obtain the dispersion B according to the invention Example 2

477.1 g of alkyd resin A obtained according to the operating conditions of example 1 described above, premelted at 80-100° C., are introduced into a 1 liter reactor. When the temperature of the reactor is stabilized at 85° C., the following two surfactants are introduced: the phosphate surfactant (19.7 g) and the non-ionic surfactant, which is the ethoxylated/propoxylated $C_4$-$C_8$ alcohol (9.7 g).

The mixture is left stirring for 30 minutes. 112 g of water are subsequently introduced over 30 minutes and the reactor is cooled down to 65° C. 55.3 g of 10% LIOH are then introduced over 30 minutes in order to neutralize the alkyd and the phosphate surfactant. The mixture is left stirring for 30 minutes while cooling down to 60° C. Finally, 345 g of water are introduced over 2 hours while maintaining the temperature at 60° C. The reactor is subsequently cooled to ambient temperature and the solids content adjusted to 50%.

In the end, an emulsion B is obtained which exhibits the following characteristics:

Solids content: 50% pH: 7.5

Brookfield viscosity at 23° C.: <100 mPa·s

Size of the particles: <200 nm

The stability on storage at 50° C. for 1 month relating to the variation or not in the solids content of the emulsion B, according to the invention, in comparison with a reference commercial product which is Synaqua®4804 from Arkema, is presented in table 2 below.

The stability on storage at 50° C. consists in measuring the solids content at the surface of the sample and in comparing it with the solids content measured at the bottom of the sample. If, after one month of storage at 50° C., the difference in solids content measured is not greater than 2%, the stability is regarded as good.

TABLE 2

| Emulsion | Stability 50° C. |
|---|---|
| Emulsion B according to the invention | Good |
| Commercial alkyd emulsion Synaqua ® 4804 (Arkema) | Good |

The yellowing of the alkyd emulsion B according to the invention is also compared with that of Synaqua®4804. The results obtained are collated in table 3 below.

TABLE 3

| Emulsion | Yellowing index according to ASTM 313-96 | |
|---|---|---|
| | 1 month at ambient T° C. | 1 month at 50° C. |
| Alkyd emulsion B invention | 8 | 18.7 |
| Synaqua ® 4804 (comparative) | 8.8 | 21.4 |

The alkyd emulsions compared were formulated in a gloss paint with a pigment volume concentration (PVC) of 18% and with a $TiO_2$ content of 24% with an iron-based drying agent.

Formulation Used (See Table 4 Below)

TABLE 4

| Component/Reference | Function | Parts by weight |
|---|---|---|
| Water | | 141.6 |
| Acticide ® MBS | Biocide | 2 |
| Disperbyk ® 190 | Dispersing agent | 6 |
| Byk ® 022 | Antifoam | 1.5 |
| Tiona ® 595 | Titanium dioxide | 240 |
| Alkyd dispersion (at 50% solids content) | Binder | 562.7 |
| Borchi Oxy-Coat ® 1101 | Iron-based drier | 1.4 |
| Coapur ® 830W | Thickener | 5.6 |
| Coapur ® 2025 | Thickener | 39.2 |

Calculated Characteristics of the Formulation No. 1 (without Drier):
  PVC=18.2%
  Solids content by weight=approximately 54%
  Solids content by volume=approximately 41%

The performance qualities relating to the resistance to yellowing, the development of hardness, the resistance to blocking and the gloss of the formulation of the dispersion, according to the invention, were compared with those of the formulation with Synaqua® 4804 in table 5 below.

TABLE 5

| Formulation | Yellowing index according to ASTM 313-96 | | Development of hardness (s) | | Resistance to blocking | | 20/60° Gloss |
|---|---|---|---|---|---|---|---|
| | 1 month at ambient T ° C. | 1 month at 50° C. | 1 day | 4 days | 48 h of drying, 24 h of contact ambient T ° C. | 48 h of drying, 1 h of contact, 50° C. | 24 h at ambient T ° C. |
| Paint with alkyd emulsion B | 1.7 | 8.3 | 63 | 106 | 1 | 1 | 94/97 |
| Paint with Synaqua ® 4804 | 2.8 | 9 | 59 | 96 | 7 | 8 | 90/95 |

Evaluation of the Brookfield viscosity at 23° C., 10 rpm, using the 2 and 3 spindles on a Brookfield RVDVE-230 viscometer according to the standard ISO 2555.

3) Size of the Particles:

The size of the particles is measured using a device of Zetasizer-Malverb Instruments Ltd type. The dispersion sample is diluted in a transparent cell using filtered deionized water, the size of the particles being measured by 90° laser scattering.

4) Acid Number and Hydroxyl Number:

The acid number is evaluated according to the standard ISO 3682.

The hydroxyl number is evaluated according to the standard NFT 30-403.

5) Hardness:

The hardness is evaluated using a Persoz hardness pendulum on films with a wet thickness of 100 μm applied to glass sheets after different drying times and according to the standard ISO 1522.

6) Yellowing

Device of the "Dr Lange" Micro Color LMC spectrocolorimeter type.

Measurements of the yellowing index Yi according to the standard ASTM 313-96 on dry films at different drying times.

The films with a wet thickness of 150 μm are applied to Leneta charts using a Bird film applicator.

7) Gloss:

The measurements are taken using a BYK Gardner GmbH micro-TRI-gloss glossmeter at 20°, after different drying times for wet films with a thickness of 200 μm deposited on glass sheets and according to the standard ISO 2813.

8) Resistance to Blocking:

The paints to be evaluated are applied to two Leneta 2A charts at a chosen thickness using a film applicator. These paints are stored in a climate-controlled chamber (at 23° C.±1° C. and at 50%±5% RH) for a predetermined time. The painted faces of these charts are subsequently placed face to face between 2 glass sheets. The assembly is compressed by a weight which makes it possible to obtain a pressure of 50 g/cm$^2$ over the entire test surface. The painted faces are left in contact in a climate-controlled chamber for a predetermined time. At the end of the contact time, the charts are gently separated by pulling on the 2 charts, in all directions.

The damage caused on the paint films is then quantified on a scale varying from 0 to 8 according to the instructions given in the table below (with 0 signifying the best performance and 8 signifying the worst performance):

Tests and Methods Used

These tests and methods are valid in general for the characteristics mentioned in the description and in particular in the examples presented.

1) Solids Content:

Evaluation according to ISO 3251 according to the conditions: 1 g of dispersion for 1 hour at 125° C. and the result is expressed in %.

2) Viscosity:

Evaluation of the Noury viscosity at 110° C. on bulk resin according to the standard AFNOR XPT 51213 and expressed in mPa·s.

| Scale of evaluation of the resistance to blocking | |
|---|---|
| 0 | No adhesion between the films and no noise during the separation of the charts |
| 1 | Detachment of the films with a slight noise but without a detrimental change in the test surface |
| 2 | Tearing < 10 points on the test surface |
| 3 | Tearing < 50 points on the test surface |
| 4 | Tearing > 50 points on the test surface |
| 5 | Tearing of the surface < 20% of the test surface |
| 6 | Tearing of the surface between 20% and 50% of the test surface |
| 7 | Tearing of the surface > 50% of the test surface |
| 8 | Complete tearing of the test surface |

The invention claimed is:

1. An aqueous alkyd resin dispersion comprising:
   a) a short oil alkyd resin having a Noury viscosity at 110° C. according to AFNOR XPT 51213 ranging from 7000 to 13 000 mPa·s and comprising, in its fatty acid component a1), at least one polyunsaturated fatty monoacid a11) having at least two unsaturations per molecule and a content by weight of monoacid a111) having conjugated unsaturations of at least 35%, the content by weight of said fatty monoacid a111), with respect to said alkyd resin, being from 5% to 40%,
   b) at least one anionic phosphate surfactant which is a phosphate alkyl alkoxy ester.

2. The aqueous dispersion of claim 1, wherein said fatty monoacid a11) is a product of the dehydration of castor oil.

3. The aqueous dispersion of claim 1 wherein the acid number of said resin is less than 25 KOH/g.

4. The aqueous dispersion of claim 1 wherein said surfactant b) is a phosphate ester of a $C_{10}$ to $C_{16}$ alcohol which is alkoxylated with from 4 to 10 ethoxy units.

5. The aqueous dispersion of claim 4 wherein said surfactant b) comprises a phosphate diester and a phosphate monoester of said alcohol.

6. The aqueous dispersion as claimed in claim 1 wherein said surfactant b) is a mixture of phosphate monoester and of phosphate diester with the ratio by weight of the phosphate monoester to the phosphate diester being from 0.8 to 1.2.

7. The aqueous dispersion as claimed in claim 4 wherein said alcohol is a $C_{12}$ to $C_{14}$ alcohol.

8. The dispersion of claim 7 wherein the number of said alkoxy units is from 4 to 8.

9. The dispersion of claim 1 wherein the content by weight of said surfactant b) with respect to said dispersion varies from 1% to 3%.

10. The dispersion of claim 1 wherein the content by weight of said alkyd resin a) with respect to said dispersion varies from 35% to 65%.

11. The dispersion of claim 1 wherein said dispersion comprises, in addition to said surfactant b), a surfactant c) chosen from the group consisting of polymeric non-ionic surfactants with a ratio by weight of anionic surfactant b) to non-ionic surfactant c), b)/c), ranging from 1 to 3.

12. The dispersion of claim 1 wherein said resin comprises, in its acid component A, at least one aromatic dicarboxylic acid or anhydride a2) and optionally an aromatic monocarboxylic acid a3) and, in its alcohol component B, a polyol b1) with a functionality ranging from 3 to 6.

13. The dispersion as claimed in claim 1 wherein said alkyd resin additionally comprises, in its fatty acid component a1), at least one other non-conjugated polyunsaturated fatty monoacid a12) having at least two unsaturations per molecule and comprising at least 90% by weight of a non-conjugated polyunsaturated monoacid a121).

14. A process for the preparation of an aqueous dispersion of claim 1, said process comprising the following successive stages:
   i) Preparation of said alkyd resin a) in bulk,
   ii) Melting said resin a),
   iii) Addition of said surfactant b) and optionally of a non-ionic surfactant c),
   iv) Partial addition of water, before
   v) Neutralization of the acidity of a) and of b) by a base, said base selected from LiOH, KOH, NaOH, $NH_4OH$ and tertiary amines,
   vi) Emulsification by phase inversion with adjustment of the solids content after the emulsification.

15. The process of claim 14 wherein stages ii) and iii) are carried out at a temperature ranging from 80 to 100° C., stage iv) at a temperature ranging from 80 to 65° C., stage v) at a temperature ranging from 60 to 70° C. and stage vi) at a temperature ranging from 55 to 65° C.

16. A coating composition comprising an aqueous dispersion of claim 1.

17. The composition of claim 16 which is an aqueous paint, varnish or stain composition.

* * * * *